(12) United States Patent
Bayer et al.

(10) Patent No.: US 8,986,888 B2
(45) Date of Patent: Mar. 24, 2015

(54) MATERIAL FOR NEGATIVE ELECTRODES, AND NEGATIVE ELECTRODES AND BATTERIES COMPRISING THIS MATERIAL, AND PROCESS FOR PRODUCING THE MATERIAL

(75) Inventors: Cornelia Bayer, Graz (AT); Christoph Stangl, Loeben (AT); Colin God, Graz (AT); Stefan Koller, Wettmannstätten (AT); Nikolaus Hochgatterer, Graz (AT); Heimo Kreimaier, Graz (AT); Gabriel Stabentheiner, Zettling (AT)

(73) Assignee: MAGNA STEYR Battery Systems GmbH & Co OG, Zettling (AT)

( * ) Notice: Subject to any disclaimer, the term of this patent is extended or adjusted under 35 U.S.C. 154(b) by 31 days.

(21) Appl. No.: 13/697,363

(22) PCT Filed: May 11, 2011

(86) PCT No.: PCT/EP2011/057596
§ 371 (c)(1),
(2), (4) Date: Nov. 11, 2012

(87) PCT Pub. No.: WO2011/141501
PCT Pub. Date: Nov. 17, 2011

(65) Prior Publication Data
US 2013/0059206 A1 Mar. 7, 2013

(30) Foreign Application Priority Data
May 11, 2010 (AT) .................... A 798/2010

(51) Int. Cl.
*H01B 1/02* (2006.01)
*H01M 4/583* (2010.01)
(Continued)

(52) U.S. Cl.
CPC .............. *H01M 4/134* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS 6,235,427 B1    5/2001  Idota et al.
6,300,013 B1 *  10/2001  Yamada et al. ............ 429/231.8
(Continued)

FOREIGN PATENT DOCUMENTS

CN          1272698 A       11/2000
WO       2008106280          9/2008

OTHER PUBLICATIONS

Jinghuan Jia, Chinese Patent Application No. 201180023597.6 First Office Action, Jun. 25, 2014, pp. 1-2, The Patent Office of the People's Republic of China, Beijing, China. English abstract submitted.

*Primary Examiner* — Patrick Ryan
*Assistant Examiner* — Christopher Domone
(74) *Attorney, Agent, or Firm* — Jordan IP Law, LLC; Todd A. Vaughn

(57) ABSTRACT

A material for a battery or an accumulator, especially for a negative electrode of an accumulator, for example, a lithium ion secondary battery, the use of such a material, an electrode that includes such a material, a battery having such an electrode, and a process for producing such a material. The material includes carbon, an alloy and/or a mixture of silicon with at least one element of main group 1 of the Periodic Table of the Elements excluding lithium, and optionally at least one further metallic element and production-related impurities, the elements being distributed within a silicon phase in the case of a mixture, and a binder which binds carbon and the alloy and/or the mixture to give a solid material.

25 Claims, 4 Drawing Sheets

(51) Int. Cl.
  *H01M 4/134* (2010.01)
  *H01M 4/133* (2010.01)
  *H01M 4/1393* (2010.01)
  *H01M 4/1395* (2010.01)
  *H01M 4/36* (2006.01)
  *H01M 4/38* (2006.01)
  *H01M 10/052* (2010.01)

(52) U.S. Cl.
  CPC ........... *H01M 4/1395* (2013.01); *H01M 4/364* (2013.01); *H01M 4/38* (2013.01); *H01M 10/052* (2013.01); *Y02E 60/122* (2013.01)
  USPC .................. 429/231.8; 429/252; 252/503

(56) References Cited

U.S. PATENT DOCUMENTS

| | | | |
|---|---|---|---|
| 7,674,555 B2* | 3/2010 | Nanba et al. | 429/231.8 |
| 7,732,095 B2* | 6/2010 | Christensen et al. | 429/218.1 |
| 2007/0281216 A1* | 12/2007 | Petrat et al. | 429/324 |
| 2008/0050655 A1* | 2/2008 | Chu et al. | 429/231.8 |

* cited by examiner

MATERIAL FOR NEGATIVE ELECTRODES, AND NEGATIVE ELECTRODES AND BATTERIES COMPRISING THIS MATERIAL, AND PROCESS FOR PRODUCING THE MATERIAL

CROSS-REFERENCE TO RELATED APPLICATIONS

The present application is a National Stage application of PCT International Application No. PCT/EP201 1/057596 (filed on May 11, 2011), under 35 U.S.C. §371, which claims priority to Austrian Patent Application No. A 798/2010 (filed on May 11, 2010), which are each hereby incorporated by reference in their respective entireties.

FIELD OF THE INVENTION

The invention relates to a material for a battery or an accumulator, especially for a negative electrode of an accumulator, for example, of a lithium ion secondary battery.

The invention further relates to the use of such a material and also an electrode comprising such a material.

The invention also relates to a battery or an accumulator comprising an electrode comprising such a material.

The invention finally relates to a process for producing a material for a battery or an accumulator, especially for a negative electrode of an accumulator, for example of a lithium ion secondary battery.

BACKGROUND OF THE INVENTION

Lithium ion secondary batteries are used in many electrically operated devices, more particularly, for use in daily life, in order to ensure energy supply. In the last few years, lithium ion secondary batteries have to an ever greater extent displaced secondary batteries used hitherto, particularly in the sector of portable electronic devices. The reason for this is that lithium ion secondary batteries can have a high energy density.

For negative electrodes of lithium ion secondary batteries, principally carbon is used as the host material. The carbon may be in the form, for example, of what is called conductive black or in the form of (likewise conductive) graphite. Carbon in the form of conductive black or graphite is particularly notable in that, and is used because, carbon has only very small changes in volume in the course of reversible intercalation of lithium in charging and discharging operations. However, an important disadvantage of the use of carbon is that a maximum capacity of, for example, graphite is limited to about 372 mAh/g.

In view of the restrictions resulting from carbon, i.e., conductive black or graphite, there are efforts to find alternative materials, or to optimize known ones, for negative electrodes of lithium ion secondary batteries. In this regard, WO 2005/096414 A2 proposes using nanoscale silicon particles as well as a customary binder. Silicon can bind lithium to a high degree, which results in a high theoretical specific capacity. However, silicon, on reversible uptake of lithium, is subject to a significant change in volume, which is disadvantageous. WO 2005/096414 A2 therefore proposes using nanoscale silicon particles for production of a material for a negative electrode. This is supposed to ensure sufficient stability of the electrode material on reversible incorporation and discharge of lithium with small irreversible losses of capacity. However, studies have shown that cycling stability is achieved only at low current stresses on the electrode. In the case of constant current cycling operations with high current stresses, a significant decline in capacity occurs after a few cycles.

Also known is use of alloys of silicon as an electroactive material in negative electrodes for lithium ion secondary batteries, for example, from U.S. Patent Publication No. 2009/0061322 A1. In this case, silicon-titanium alloys or else alloys of silicon with copper or other silicon alloys may be used. In addition, the silicon in these alloys has been doped, for example, with boron, aluminum or gallium. One disadvantage of these materials is the complex production or the requirement for doping of the material.

Moreover, in accordance with U.S. Pat. No. 6,300,013 B1, silicon is used as an electroactive material in negative electrodes for lithium ion secondary batteries. In this case, silicon is in the form of silicon alloys, especially alloys in the silicon-magnesium alloy system. These alloys, however, are probably also subject to a relatively great change in volume on reversible incorporation and discharge of lithium, and therefore a high carbon content of more than 50 percent by weight (% by weight) is necessarily provided at the same time in order to buffer any change in volume.

SUMMARY OF THE INVENTION

It is an object of the invention to specify a material of the type mentioned at the outset, with which reversible incorporation and discharge of lithium can be ensured over a prolonged period, which corresponds to a stable capacity.

It is a further object of the invention to describe a use of such a material.

It is still a further object of the invention to provide an electrode with which reversible incorporation and discharge of lithium can be ensured over a prolonged period, which corresponds to a stable capacity.

It is another object of the invention to specify a battery or an accumulator whose electrode ensures reversible incorporation and discharge of lithium over a prolonged period, which corresponds to a stable capacity.

Finally, it is an object of the invention to specify a process of the type mentioned at the outset with which it is possible to produce a material which ensures reversible incorporation and discharge of lithium over a prolonged period, which corresponds to a stable capacity.

The first object is achieved by a material of the type mentioned at the outset, comprising or consisting of: a) carbon; b) an alloy and/or a mixture of silicon with at least one element of main group 1 of the Periodic Table of the Elements excluding lithium, and optionally at least one further metallic element and production-related impurities, the elements being distributed within a silicon phase in the case of a mixture; and c) a binder which binds carbon and the alloy and/or the mixture to give a solid material.

An advantage achieved by the invention is considered to be that frequent reversible incorporation and discharge of lithium and a stable capacity on use of the material as an electrode material is ensured, especially for a negative electrode of a lithium ion secondary battery. It has been found that, surprisingly, reaction of high-purity silicon with at least one element of main group 1 of the Periodic Table of the Elements excluding lithium leads to an alloy or possibly to a mixture which has an essentially constant capacity even in the case of relatively high current stresses or a constant current cycling operation at high capacities for, for example, 50 cycles. In this regard, it has also been found in experiments, surprisingly, that correspondingly favorable results were not obtainable with elements of main group 2 of the Periodic Table of the Elements as a constituent of the alloy or of the mixture. Nevertheless, elements of main group 2 of the Periodic Table of the Elements and optionally further metallic elements may also be present, at least in relatively small amounts, in the alloy and/or the mixture. In addition, production-related impurities associated with the production of the silicon may also be present, which are not troublesome per se.

It is essential in the context of the invention that the elements of main group 1 form an alloy with the silicon and/or are present as a mixture with silicon. In the case of a mixture, the elements of main group 1 of the Periodic Table of the Elements excluding lithium are distributed within a silicon phase.

Preferably, the at least one element from main group 1 of the Periodic Table of the Elements excluding lithium is sodium and/or potassium. Silicon which has been reacted with sodium and/or potassium leads, in the case of use in an inventive material, to high capacities and, in the case of repeated incorporation and discharge of lithium, essentially stable capacities, even for a multitude of cycles.

It is appropriate that the at least one element from main group 1 of the Periodic Table of the Elements excluding lithium is present in the alloy and/or the mixture in a proportion of less than 50% by weight, in order that the effects associated with the silicon are manifested very substantially fully. More particularly, it may also be the case that the at least one element from main group 1 of the Periodic Table of the Elements excluding lithium is present in the alloy and/or the mixture in a proportion of less than 40% by weight, preferably less than 25% by weight, or else less than 10% by weight. Overall, it has been found that even small contents of, for example, sodium and/or potassium in the alloy and/or the mixture are sufficient to achieve high and stable capacities on repeated incorporation and discharge of lithium. At the same time, with low proportions of, for example, sodium and/or potassium in the alloy and/or the mixture, the silicon content is high, which is likewise advantageous. It is therefore advisable that the at least one element from main group 1 of the Periodic Table of the Elements excluding lithium is present in the alloy and/or the mixture in a proportion of less than 5% by weight, especially less than 1.0% by weight.

The alloy and/or the mixture which generally comprises silicon as the main constituent is preferably in the form of particles, which is firstly a result of the production, for example a result of vaporization of silicon particles, and secondly allows simple further processing with the other constituents of the inventive material. An average particle size of the particles is advantageously less than 500 nm. From the point of view of production of a homogeneous alloy or of a homogeneous mixture, it is particularly preferred that the particles have an average particle size of less than 200 nm.

Any carbon content in the inventive material may in principle be as desired and may, for example, be up to 95% by weight. Since, however, it is firstly unnecessary to provide a high carbon content in order to buffer any change in volume of other constituents of the material, and an alloy and/or mixture component should secondly be of maximum size for the purpose of high electrochemical activity, it is advantageously the case that any carbon content is less than 40% by weight, preferably less than 25% by weight, especially about 5 to 15% by weight.

The carbon may be used in any form as known per se from the prior art. The carbon is appropriately present in the form of (conductive) carbon black, graphite, or in the form of what is called hard carbon.

In an inventive material, any binder content can also be set to relatively low contents. Advantageously, any binder content is less then 20% by weight, preferably about 3 to 13% by weight.

It is particularly preferable that the binder is a polysaccharide. It has been found that a polysaccharide, especially sodium carboxymethylcellulose or else optionally another cellulose derivative, can enter into a high interaction with silicon particles, especially to form covalent bonds. This promotes the production of an inventive material in solid form with low binder contents, and nevertheless high stability of the material in use. Another possibility is an alternative or simultaneous use of a binder which is typically used in positive electrodes of such secondary batteries, for example a styrene-butadiene rubber (SBR).

The further object of the invention is achieved by the use of an inventive material as an electrode material in lithium ion secondary batteries.

The object of providing an electrode of the type mentioned at the outset which has a stable capacity on reversible incorporation and discharge of lithium over a prolonged period is achieved when the electrode comprises an inventive material.

The object of providing a battery or an accumulator with stable capacity even on repeated incorporation and discharge of lithium is achieved by a battery or an accumulator having an inventive electrode.

The process-related object of the invention is achieved when a process of the type mentioned at the outset comprises the following steps: a) providing carbon; b) providing an alloy and/or a mixture of silicon with at least one element of main group 1 of the Periodic Table of the Elements excluding lithium, and optionally at least one further metallic element and production-related impurities, the elements being distributed within a silicon phase in the case of a mixture; c) providing a binder which binds carbon and the alloy and/or the mixture to give a solid material; and then d) mixing the components provided in steps a) to c) and optionally treating thermally and/or mechanically in order to form the material in solid form.

One advantage achieved by a process according to the invention is considered to be that it is possible, in a simple manner, to provide a material for an electrode, especially a negative electrode of a lithium ion secondary battery, which provides a stable and high capacity on repeated incorporation and discharge of lithium.

It is preferably the case that particles of silicon having an average particle size of less than 500 nm are treated with at least one element of main group 1 of the Periodic Table of the Elements excluding lithium in order to provide the alloy and/or the mixture. It is preferably the case that the particles used have an average particle size of less than 200 nm. Silicon particles with a low average particle size can be used to produce alloys or mixtures in which the introduced elements of main group 1 of the Periodic Table of the Elements excluding lithium are in homogeneous distribution. More detailed studies of the microstructure of corresponding alloys and/or mixtures remain to be conducted, but it is suspected that a homogeneous microstructure also has a favorable effect on the macroscopically detectable physical parameters, for example high and stable capacity on repeated incorporation and discharge of lithium.

The alloy and/or the mixture can in principle be produced in any desired manner. For example, it is possible to proceed from silicon particles having an average particle size of less than 500 nm and to react these particles with sodium and/or potassium in a solvent. It is also possible to introduce the elements of main group 1 of the Periodic Table of the Elements excluding lithium with silicon particles as early as in the course of production. It is preferable, however, that the alloy and/or the mixture is produced by reacting solid silicon with at least one element, present in liquid form at reaction temperature, of main group 1 of the Periodic Table of the Elements excluding lithium. The corresponding elements of main group 1 of the Periodic Table of the Elements all have low melting points, and so a simple process regime which enables diffusion of alkali metals into solid silicon particles is possible.

It may also be the case that the alloy and/or the mixture is produced by reacting solid silicon with at least one element, present in gaseous form at reaction temperature, of main group 1 of the Periodic Table of the Elements excluding lithium. In this case, for example, silicon particles having an average particle size of less than 500 nm are exposed to an alkali vapor for a particular time, such that, for example, sodium and/or potassium diffuse into the silicon particles, and the alloy and/or the mixture is thus formed.

For the reasons mentioned, it is preferably the case that the alloy and/or the mixture is produced with a proportion of the at least one element from main group 1 of the Periodic Table of the Elements excluding lithium of less than 5% by weight, preferably less than 1.0% by weight.

In addition, it is preferably the case that the material is produced with a carbon content of less than 40% by weight, preferably less than 25% by weight, especially about 5 to 15% by weight, since any carbon content can be kept low without any adverse effects. In principle, however, any carbon content may be as desired and may, for example, be up to 95% by weight.

The binder used is advantageously a polysaccharide, especially sodium carboxymethylcellulose. Any binder content is advantageously set to less than 20% by weight, preferably about 3 to 13% by weight. A polysaccharide offers several advantages as a binder in connection with silicon particles. Firstly, strong interactions, especially covalent bonds, can be formed between the polysaccharide and individual silicon particles, which is favorable in relation to mechanical stability of the material produced. Secondly, any proportion of the binder can be kept relatively low, as a result of which any proportion of the electrochemically active alloy or of the mixture can in turn be higher. In addition, the components provided can also be processed in the aqueous phase, which allows a simple process regime. Another possibility is an alternative or simultaneous use of a binder which is customarily used in positive electrodes of such secondary batteries, for example, a styrene-butadiene rubber (SBR).

In accordance with the advantages possible in the process, a process for producing a battery or an accumulator preferably encompasses a process according to the invention.

Further features, advantages and effects of the invention are evident from the working examples described hereinafter.

BRIEF DESCRIPTION OF THE DRAWINGS

The drawings, to which reference is made, illustrate.

DETAILED DESCRIPTION OF EMBODIMENTS

1. Production of Electroactive Material

Figure 1:
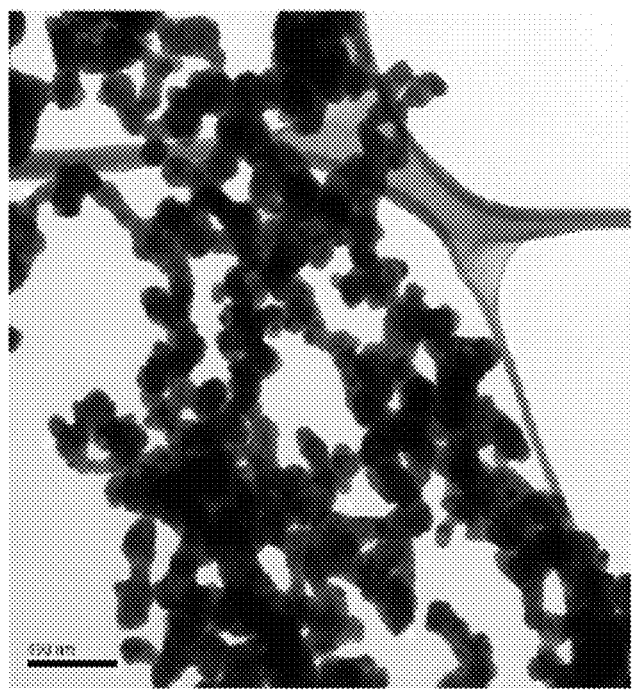
FIG. 1 illustrates a transmission electron micrograph of silicon particles.

For the production of electroactive materials for negative electrodes, silicon powders having particles with a small average particle size of less than 500 nm were used. Such powders were purchased from the Applicant of WO 2005/096414 A2. The silicon powders used were stored in argon prior to use, such that formation of $SiO_2$ could be prevented. However, silicon powders which had been stored under air prior to use were deliberately also used.

All elements from main group 1 and alternative elements from main group 2 of the Periodic Table of the Elements were used in commercial standard form.

1.1. Operating Steps with Liquid Alkali Metals

For production of electroactive material by reaction of silicon powder with liquid alkali metal, a pellet of the silicon powder was pressed under air. A proportion of about 10% by weight of a liquid sodium-potassium alloy was dripped onto this pellet with a pipette. Subsequently, the pellet was transferred into a high-temperature glass tube oven and, after purging with argon three times to establish a protective gas atmosphere, heat-treated at a temperature of 800° C. for 24 hours. Subsequently, the oven was cooled and the pellet was ground as finely as possible in an agate mortar, in order subsequently to have powder available for an electrode preparation.

1.2. Operating Steps with Solid Alkali Metals

Alkali metal used was comminuted mechanically as far as possible if it was not purchased as powder in any case. A proportion of about 10% by weight or less of the alkali metal was weighed into a weighing boat in a protective argon atmosphere and mixed with the additional amount of silicon powder by shaking A pellet of this silicon-alkali metal mixture was pressed, which was transferred into a high-temperature glass tube oven. This was followed by purging with argon three times for the purpose of establishing a protective gas atmosphere. Thereafter, the pellet was subjected to a heat treatment in the region of the melting point of the alkali metal for two to three days. This involved working both with molten alkali metal and with alkali metal remaining below the melting point, and in the second case only a small portion contributed to the vapor pressure. After cooling the oven, the pellet was ground as finely as possible in an agate mortar, in order subsequently to have powder available for an electrode preparation.

1.3. Operating Steps with Gaseous Alkali Metals

An alkali metal present in pieces was comminuted with a knife, if required. A proportion of about 10% by weight of sodium or another alkali metal excluding lithium was weighed into a small quartz glass eprouvette. The additional amount of silicon powder was weighed into an airtight gas flask (volume approx. 200 ml), and the eprouvette filled beforehand with sodium or another alkali metal was likewise placed into the glass flask. Subsequently, the sample was heat-treated at a temperature of 300° C. in a glass oven (B580 from Büchi) for 24 hours. After purging with argon, this was done under reduced pressure in order to ensure a suitable atmosphere in the glass flask. After cooling the glass oven, the powder thus treated was used directly for an electrode preparation under air.

1.4. Operating Steps with Alkaline Earth Metals

For preparation with alkaline earth metals, the above operating steps were used analogously.

2. Electrode Preparation

For the production of 1 g of electrode material for a negative electrode of a lithium ion secondary battery, typically 75 to 85% by weight of active material or material as described above was used. In addition, for production of the material, about 10 to 14% by weight of conductive black (commercially available as Super P from Timcal) and 6 to 10% by weight of binder (for example sodium carboxymethylcellulose from Wolff Cellulosics GmbH & Co. KG) were used. The solvent used was deionized water. In addition, two drops of a surfactant were added to the mixture in order to ensure better distribution of the individual components. Such a mixture was stirred by means of a magnetic stirrer for about 12 hours. Thereafter, the slurry was coated onto a copper foil by means of a manual coating bar (wet film thickness: 105 μm). The coated foils were dried in a drying line at 50° C. for approx. four hours. Subsequently, electrodes were punched out by means of a hollow punch.

3. Constant Current Cycling Operations/Cyclic Voltammetry

The electrodes produced as described above were tested by constant current cycling operations and cyclic voltammetry in comparison to known materials. The test cells used for the cyclic voltammetry measurements and constant current cycling operations were a Swagelok® cell with the following electrode arrangement:

Working electrode: silicon, modified as described (diameter 12 mm)

Counterelectrode: lithium metal (diameter 12 mm)

Reference electrode: lithium metal (about 3×3 mm)

Electrolyte: 120 μm ethylene carbonate/diethylene carbonate in a volume ratio of 3:7, 1 M $LiPF_6$, 2% by weight of vinylene carbonate Separator: Freudenberg FS2190 nonwoven, 6-ply (polypropylene, 230 μm, diameter 12 mm), and in the case of cycling additionally 1× Celgard 2400 (polypropylene, 25 μm, diameter 13 mm)

The constant current cycling operations were effected by applying a constant current to a working electrode; in the course of this, an electrode potential was measured in relation to the reference electrode as a function of time. The cycling conditions for analysis of individual electrodes were:

1. Forming at 0.1 C to 0.1 V vs. $Li/Li^+$
2. Constant current charging for one hour
3. Discharging at 0.1 C to 1 V vs. $Li/Li^+$
4. 0.5 C charging to 0.1 V vs. $Li/Li^+$
5. Constant current charging for one hour
6. 0.5 C discharging to 1 V vs. $Li/Li^{30}$ Cycling steps 4 to 6 were repeated 49 times.

4. Test Results

FIG. 1 illustrates a transmission electron micrograph of silicon particles used. As is clear, the silicon particles used which have subsequently been treated with sodium and/or potassium and, for comparative purposes, further metals have a low average particle size which is well below 500 nm. After treatment as described, these particles were used to produce a material for a negative electrode of a lithium ion secondary battery, using sodium carboxymethylcellulose as a binder.

Figure 2:
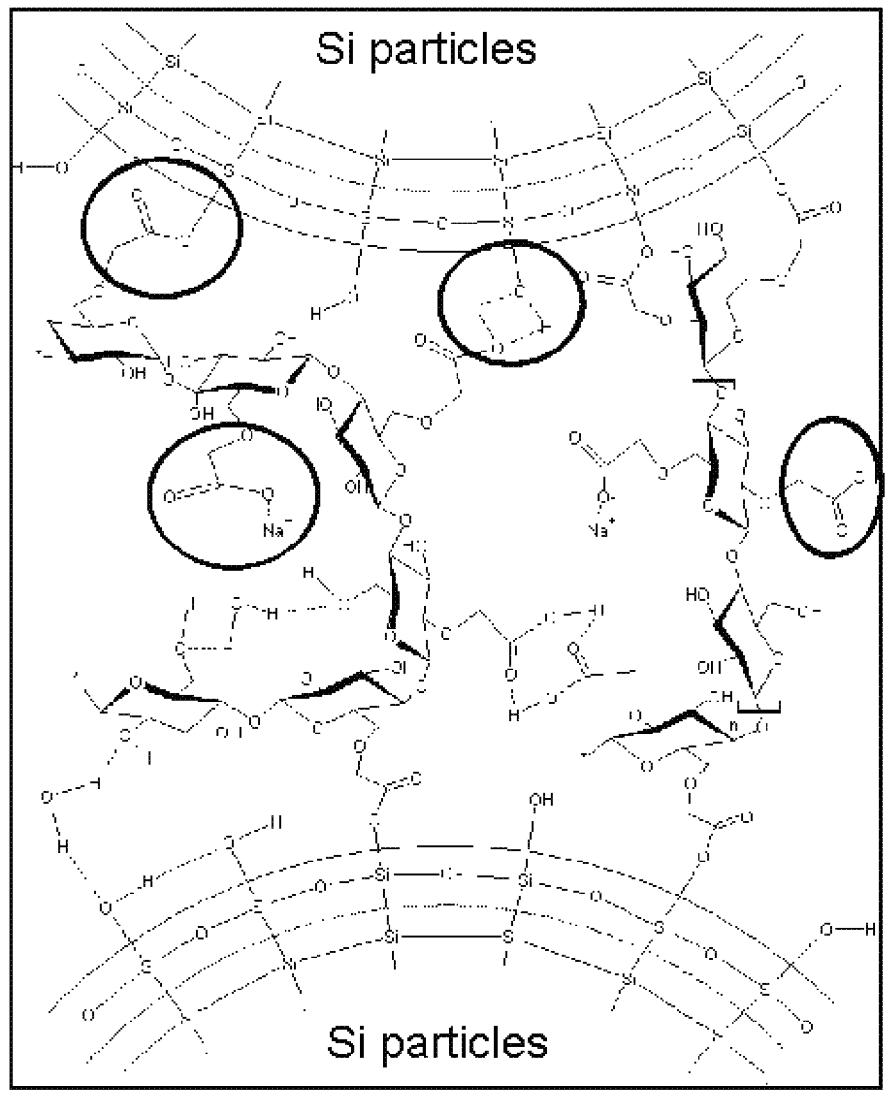
FIG. 2 illustrates a schematic diagram of a polysaccharide used as a binder with silicon particles.

This binder is advantageous in that, as illustrated in FIG. 2, there are strong interactions between the binder and the individual silicon particles. More particularly, covalent bonds or hydrogen bonds may be present.

Figure 3:
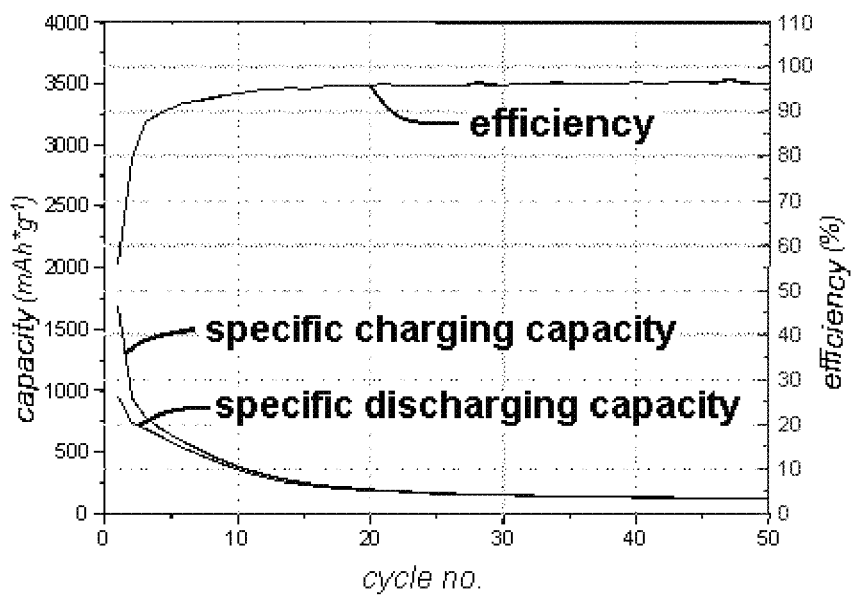
FIG. 3 illustrates a diagram relating to a constant current cycling operation with an electrode comprising silicon particles.

FIG. 3 illustrates a diagram relating to a constant current cycling operation, the negative electrode used having been produced on the basis of silicon particles illustrated in FIG. 1, but the silicon particles have not been treated separately with an alkali metal excluding lithium, for example sodium and/or potassium. As is clear in FIG. 3, in the case of appropriate current stress on the electrode for several cycles, there is a significant, reproducible decline in capacity.

Figure 4:
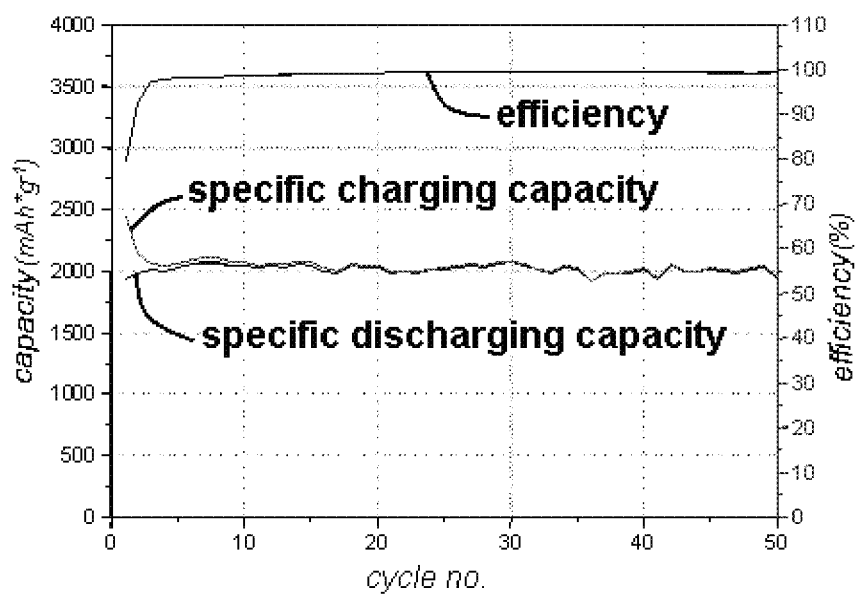
FIG. 4 illustrates a diagram relating to a constant current cycling operation with an electrode comprising an inventive material.

Compared to this, there is no such decline in capacity in the case of a configuration of an electrode with an inventive material, which is illustrated in FIG. 4 by a diagram. A corresponding decline in capacity cannot be observed in this case for multiple cycling, for example 50 cycles, which suggests reversible incorporation and discharge of lithium with stable capacity.

Similar results were obtained for various qualities of the silicon particles used and various alkali metals (excluding lithium), which is shown in table 1 below. In the course of experiments, it was also found that, surprisingly, materials in which alkaline earth metal particles had been used rather than the alkali metals for treatment of the silicon particles did not exhibit the corresponding effects.

TABLE 1

Capacities measured in half-cells (mean for cycle 30 to 40)

| Material/Storage | Original capacity (mAh/g) | Element | Treated capacity (mAh/g) |
|---|---|---|---|
| Degussa Si/Protective gas atmosphere | approx. 200 | NaK | approx. 900 |
| Degussa Si/Protective gas atmosphere | approx. 200 | Na | approx. 2000 |
| Degussa Si/Protective gas atmosphere | approx. 200 | Ca | approx. 100 |
| Degussa Si/Protective gas atmosphere | approx. 200 | Mg | approx. 100 |
| Degussa Si/Air storage | approx. 400 | Na | approx. 1500 |
| Degussa Si/Air storage | approx. 400 | NaK | approx. 150 |

Further studies have shown that ideal amounts of the alkali metals, such as sodium and/or potassium, are in the range from 0.01 to 5% by weight, preferably 0.01 to 1.5% by weight. Even these small amounts of the alkali metals are sufficient to achieve the desired effects.

Figure 5:
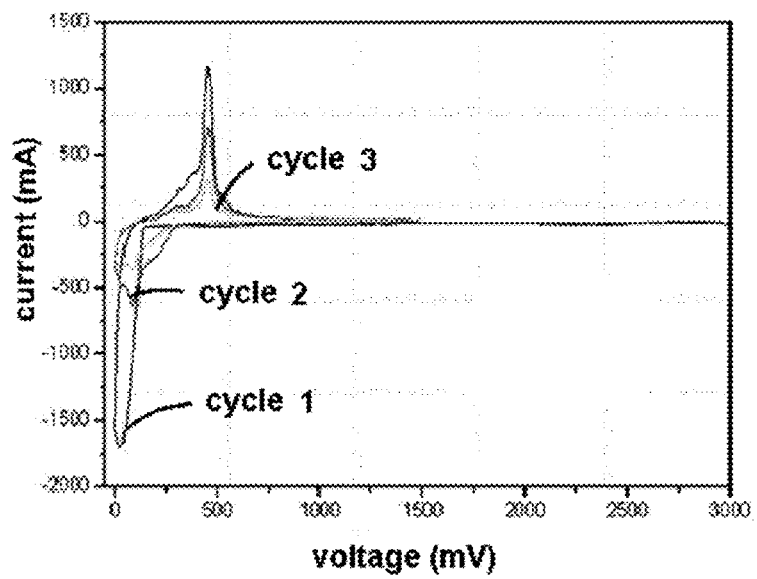
FIG. 5 illustrates a cyclic voltammogram with an electrode comprising silicon particles.
Figure 6:
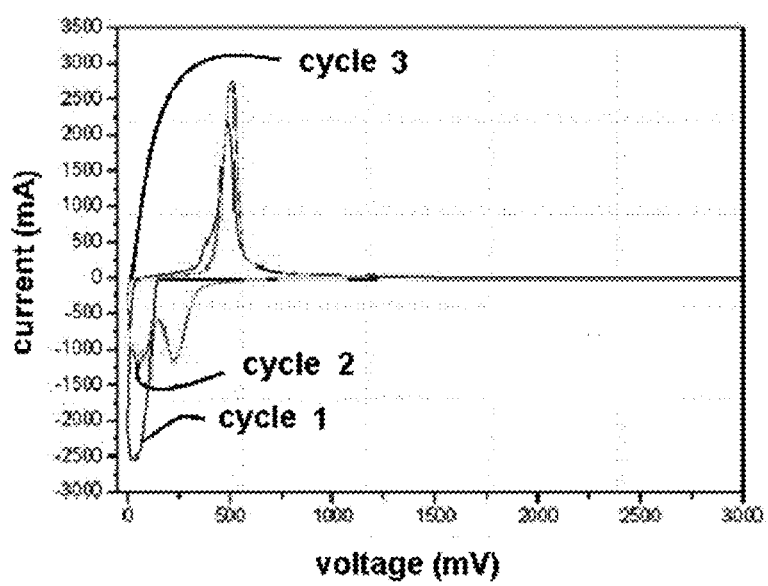
FIG. 6 illustrates a cyclic voltammogram with an electrode comprising an inventive material.

In further tests, electrodes comprising silicon particles according to FIG. 1, except untreated, and, in comparison, electrodes comprising silicon particles according to FIG. 1, except treated with sodium vapor, were studied. In the evaluation of the corresponding cyclic voltammograms, which are shown in FIGS. 5 and 6 respectively, it was found that both an efficiency and a specific discharge capacity were much higher in the case of electrodes comprising an inventive material. The evaluation of the cyclic voltammograms thus demonstrates a much better efficiency and higher capacity of the electrodes produced with an inventive material, which is also evident from tables 2 and 3 below.

TABLE 2

Evaluation of the cyclic voltammogram in FIG. 5

| Cycle No. | Specific charging capacity (mAh * $g^{-1}$) | Specific discharging capacity (mAh * $g^{-1}$) | Efficiency (%) |
|---|---|---|---|
| 1 | 2249.32 | 1327.19 | 59 |
| 2 | 1079.92 | 841.53 | 78 |
| 3 | 660.52 | 525.96 | 80 |

TABLE 3

| | Evaluation of the cyclic voltammogram in FIG. 6 | | |
|---|---|---|---|
| Cycle No. | Specific charging capacity (mAh * g$^{-1}$) | Specific discharging capacity (mAh * g$^{-1}$) | Efficiency (%) |
| 1 | 2974.35 | 2662.66 | 90 |
| 2 | 2825.32 | 2738.96 | 97 |
| 3 | 2804.55 | 2713.64 | 97 |

In addition, it can also be inferred by a direct comparison of the individual cycles that electrodes comprising an inventive material have better kinetics.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A material for a battery, the material comprising:
a) carbon present in a proportion of about 5% to 40% by weight;
b) an alloy and/or a mixture of silicon with at least one element of main group 1 of the Periodic Table of the Elements excluding lithium comprising sodium and/or potassium present in a proportion of 0.01% to 10% by weight, at least one metallic element and production-related impurities, the elements being distributed within a silicon phase in the case of a mixture; and
c) a binder which binds carbon and the alloy and/or the mixture to thereby form a solid material,
wherein the alloy and/or mixture is present in a proportion of more than 40% by weight, and the binder is present in a proportion of 3% to 19% by weight.

2. The material of claim 1, wherein the at least one element from main group 1 of the Periodic Table of the Elements excluding lithium comprising sodium and/or potassium is present in the alloy and/or the mixture in a proportion of 0.01% to 1.0% by weight.

3. The material of claim 1, wherein the alloy and/or the mixture is in a form of particles.

4. The material of claim 3, wherein the particles have an average particle size of less than 500 nm.

5. The material of claim 3, wherein the particles have an average particle size of less than 200 nm.

6. The material of claim 1, wherein the carbon is present in a proportion of about 5% to 15% by weight.

7. The material of claim 1, wherein the carbon is in a form of one of graphite, carbon black and hard carbon.

8. The material of claim 1, wherein the binder comprises a polysaccharide and/or a styrene-butadiene rubber.

9. The material of claim 8, wherein the binder comprises sodium carboxymethylcellulose.

10. An electrode for a battery, the electrode comprising:
a material including carbon present in a proportion of about 5% to 40% by weight, an alloy and/or a mixture of silicon with at least one element of main group 1 of the Periodic Table of the Elements excluding lithium comprising sodium and/or potassium present in a proportion of 0.01% to 10% by weight, at least one metallic element and production-related impurities, the elements being distributed within a silicon phase in the case of a mixture, and a binder which binds carbon and the alloy and/or the mixture to thereby form a solid material,
wherein the alloy and/or mixture is present in a proportion of more than 40% by weight, and the binder is present in a proportion of 3% to 19% by weight.

11. A battery comprising:
an electrode composed of a material including carbon present in a proportion of about 5% to 40% by weight, an alloy and/or a mixture of silicon with at least one element of main group 1 of the Periodic Table of the Elements excluding lithium comprising sodium and/or potassium present in a proportion of 0.01% to 10% by weight, at least one metallic element and production-related impurities, the elements being distributed within a silicon phase in the case of a mixture, and a binder which binds carbon and the alloy and/or the mixture to thereby form a solid material,
wherein the alloy and/or mixture is present in a proportion of more than 40% by weight, and the binder is present in a proportion of 3% to 19% by weight.

12. A process for producing a material for a battery, the method comprising:
a) providing carbon in a proportion of about 5% to 40% by weight;
b) providing an alloy and/or a mixture of silicon with at least one element of main group 1 of the Periodic Table of the Elements excluding lithium comprising sodium and/or potassium in a proportion of 0.01% to 10% by weight, and optionally at least one further metallic element and production-related impurities, the elements being distributed within a silicon phase in the case of a mixture;
c) providing a binder which binds carbon and the alloy and/or the mixture to give a solid material; and then
d) mixing the components provided in steps a) to c) and treating the mixture thermally and/or mechanically in order to form the material in solid form,
wherein the alloy and/or mixture is present in a proportion of more than 40% by weight, and the binder is present in a proportion of 3% to 19% by weight.

13. The process of claim 12, wherein particles of silicon having an average particle size of less than 500 nm are treated with the at least one element of main group 1 of the Periodic Table of the Elements excluding lithium comprising sodium and/or potassium in order to provide the alloy and/or the mixture.

14. The process of claim 12, wherein particles of silicon having an average particle size of less than 200 nm are treated with the at least one element of main group 1 of the Periodic Table of the Elements excluding lithium comprising sodium and/or potassium in order to provide the alloy and/or the mixture.

15. The process of claim 12, wherein the alloy and/or the mixture is produced by one of:
reacting solid silicon with the at least one element, present in liquid form at reaction temperature, of main group 1 of the Periodic Table of the Elements excluding lithium comprising sodium and/or potassium; and
reacting solid silicon with the at least one element, present in gaseous form at reaction temperature, of main group 1 of the Periodic Table of the Elements excluding lithium comprising sodium and/or potassium.

16. The process of claim 15, wherein the at least one element present in gaseous form comprises sodium vapour and/or potassium vapour.

17. The process of claim 12, wherein the alloy and/or the mixture is produced with the at least one element from main group 1 of the Periodic Table of the Elements excluding lithium comprising sodium and/or potassium in a proportion of 0.01% to 1.0% by weight.

18. The process of claim 12, wherein the material is produced with the carbon in a proportion of about 5% to 15% by weight.

19. The process of claim 12, wherein the binder comprises a polysaccharide and/or a styrene-butadiene rubber.

20. The process of claim 19, wherein the binder comprises sodium carboxymethylcellulose.

21. The process of claim 20, wherein the material is produced with the binder in a proportion of about 3% to 13% by weight.

22. The process of claim 20, wherein step d) is performed in the aqueous phase.

23. The process of claim 12, further including adding a surfactant prior to mixing the components provided in step d).

24. The material of claim 1, wherein the at least one element from main group 1 of the Periodic Table of the Elements excluding lithium comprising sodium and/or potassium is present in the alloy and/or the mixture in a proportion of 0.01% to 1% by weight.

25. The material of claim 1, wherein carbon black is present in a proportion of about 10% to 14% by weight, the alloy and/or mixture is present in a proportion of 75% to 85% by weight and the at least one element of main group 1 of the Periodic Table of the Elements excluding lithium is sodium, carboxymethylcellulose is present in a proportion of 6% to 10% by weight, and the specific capacity of the material is approximately 1500 mAh/g to 2000 mAh/g.

\* \* \* \* \*